United States Patent Office.

GILBERT H. SMITSON, OF RIPLEY, OHIO.

Letters Patent No. 92,666, dated July 13, 1869.

IMPROVED ARTIFICIAL HONEY.

The Schedule referred to in these Letters Patent and making part of the same.

*To all whom it may concern:*

Be it known that I, GILBERT H. SMITSON, of Ripley, in the county of Brown, and in the State of Ohio, have invented certain new and useful Improvements in Process for Manufacturing Honey; and do hereby declare that the following is a full, clear, and exact description thereof.

The nature of my invention consists in a new process of manufacturing honey, by which the manufactured article obtains not only the appearance, but also the taste and smell of genuine honey.

In order to enable others skilled in the art to which my invention appertains, to make the same, I will now proceed to describe my process.

Take four pounds of sugar and one pint of water, which are mixed in a suitable vessel, and placed on the fire until they boil. The mixture is then skimmed, and strained through red flannel, or its equivalent.

After adding one tablespoonful of pure cider-vinegar, it is returned to the fire, and again brought to a boil. While boiling, stir in one-fourth of an ounce of pulverized alum, and as soon as all is dissolved, remove from the fire.

By this means, the grain of the sugar is entirely destroyed.

As soon as the mixture has settled from its boiling state, stir in gradually one-half ounce of the best cream of tartar, which will give it the ropy appearance of pure honey. Then stir in equal parts of one tablespoonful of water and extract of roses, and as soon as cold it is ready for use.

I do not confine myself to the exact proportions of the ingredients herein mentioned, as the same may be varied according to taste, and according to the quality of sugar used.

Having thus fully described my invention,

What I claim as new, and desire to secure by Letters Patent, is—

The within-described process for manufacturing artificial honey, when composed of the ingredients and substantially in the proportions herein set forth.

In testimony that I claim the foregoing, I have hereunto set my hand, this 12th day of October, 1868.

GILBERT H. SMITSON.

Witnesses:
C. BAIRD,
W. D. YOUNG.